June 7, 1955   H. B. HATCHER   2,709,988
CATTLE CONTROLLED FEED TROUGH
Filed Aug. 6, 1954
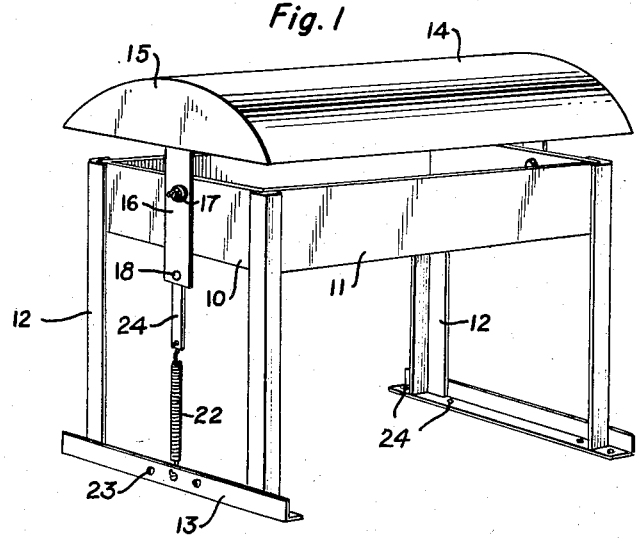
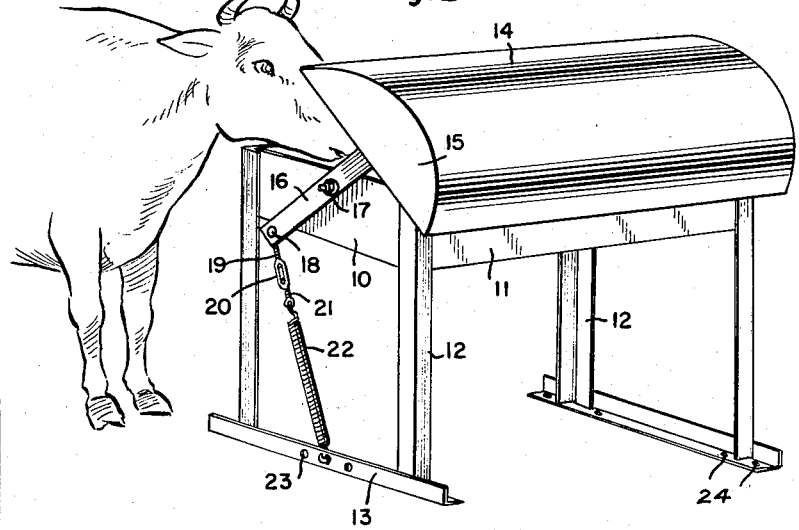
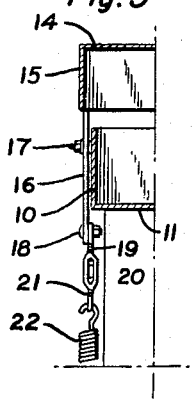
INVENTOR
H. B. HATCHER
BY
ATTORNEY

2,709,988
CATTLE CONTROLLED FEED TROUGH

Hal B. Hatcher, Forsyth, Ga.

Application August 6, 1954, Serial No. 448,294

4 Claims. (Cl. 119—62)

This invention relates to the care and feeding of animals, and more particularly to equipment used in feeding and supplying salt, and other minerals and substances for consumption by livestock.

Devices of various kinds have been produced for this purpose, but these have been unsatisfactory for numerous reasons including the fact that they were too expensive, complicated, and fragile and did not provide protection from the rain and from contamination. Also they were easily upset, causing waste, failing to provide the desired supply, and sometimes caused injury to the livestock, as well as not satisfactorily performing the function for which they were intended.

It is an object of the invention to overcome the disadvantages enumerated, to provide a portable feeder for livestock which cannot be easily upset, of simple, inexpensive, strong, practical, and durable construction, as well as one which is lightweight, economical, and which will afford protection from the elements.

Another object of the invention is to provide a structure of the character indicated having a cover which normally will be yieldably maintained in a position to protect the contents of the feeder from the elements, but which may be readily moved from its covering relation by the animal to afford access to the contents of the feeder.

Further objects and advantages of the invention will be apparent from the following description taken in conjunction with the accompanying drawings, wherein:

Fig. 1 is a perspective illustrating one application of the invention;

Fig. 2, a similar view illustrating the manner in which the cover can be pushed aside to permit a cow or other animal to have access to the contents; and Fig. 3, a vertical fragmentary section through the feeder of Fig. 2.

Briefly stated, the invention comprises a trough or container supported at an elevation above the earth, and with a pivotally mounted cover maintained in covering position by adjustable spring means, but which cover can be readily pushed aside to afford livestock access to the contents of the feeder.

The receptacle is supported by four legs, one at each corner and a cross bar or ground support extends below the legs at each end of the structure to keep them from sinking into the earth. The cover is elongated with a convex exterior, a mounting support at each end pivoted upon the end of the tray, and with the lower end of the mounting support adjustably connected by a spring to a cross bar beneath the ends of the legs. Thus movement of the cover is permitted by expansion of the spring, the tension on which can be varied by the use of a turnbuckle. The cover is limited in its swinging movement in each direction by contact of the mounting support with the legs.

With continued reference to the drawing, the device of the present invention comprises a rectangular relatively shallow trough or container having ends 10 and sides 11. The trough is supported at each of its corners by a leg 12 of angle-iron construction the legs being attached by welding or in any other desired manner so that the sides of each leg fit snugly against both an end and a side of the trough and in addition to supporting the same at an elevation strengthen or reinforce the trough.

Additional rigidity may be obtained by the provision of an angle-iron foundation or cross-member 13 beneath the pair of legs at each end of the trough, such cross-members being welded or otherwise attached to the rear extremities of the legs and with one side of the cross-member in horizontal position beneath the legs and the other side disposed in vertical position in contact with the flat upwardly extending portion of the leg. These cross-members 13 prevent the legs from sinking into the earth.

In order to protect the contents of the trough from the elements and from unauthorized consumption by small animals or the like, the trough is provided with a cover 14 curved from side to side and with flat ends 15. The cover is of a length and width slightly greater than the trough and is mounted by means of a centrally depending bar 16 attached at each end to the cover and with each bar mounted on a pivot 17 allowing limited swinging movement of the cover to afford access of the trough to livestock.

In order to counterbalance the weight of the cover a bolt 18 is mounted in the lowermost ends of one of the bars 16 and to this is attached a turnbuckle 20 connected to a screw eye 19 which connects the turnbuckle to the bolt 18. A spring 22 is connected to eye bolt 21 and has its remote end hooked into one of a series of openings 23 in the foundation or cross-member 13. In order to anchor the feeder in place on the ground the foundation or cross members 13 may be provided with openings 24.

As illustrated in Fig. 2, the cover may be pushed aside by a cow or other domestic animal in order that such animal may have access to the contents of the trough. The spring 22 will maintain the cover over the trough excluding the elements and smaller animals.

Counterbalancing of the top with positive pressure in the manner indicated is important and has been found to possess advantages which are unobvious such as, for example, having its oscillations or vibrations dampened so that it will not continue to oscillate or vibrate under the influence of the wind and produce sounds. Also the top being under greater tension will require greater force to operate as the spring tension will not be so easily overcome and the top so easily displaced but it will be kept in a position to protect the contents of the feeder except when displaced by livestock from the elements as well as from small animals and the like whether the feeder is supported on inclined terrain or not. Likewise the use of spring tension reduces bulk and weight which is particularly advantageous in the transportation and storage of the device.

If desired, instead of the turnbuckle 20 and the screw eyes 19 and 21, a link 24 may be employed for connecting the bolt 18 and the spring 22 with consequent reduction in adjustment of spring tension.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A cattle feeder comprising a relatively shallow substantially rectangular trough or container for food and minerals to be fed, angle-iron legs fitted to the corners and reinforcing and supporting said trough at an elevation, a supporting bar beneath and connected to the legs at each end of said trough, a cover for said trough curved from side to side with closed ends and of a length and breadth slightly greater than that of said trough, a depending support attached at each end to said cover, pivot bolts connecting said supports to the end of said trough for swinging movement, a connection between the lower end of at least one of said supports and the mid portion of said supporting bar including spring means for maintaining said top in position to cover said trough, and means for attaching said spring means to said depending support, including a turnbuckle for adjusting the tension of said spring means.

2. A cattle feeder comprising a relatively shallow substantially rectangular trough or container for food and minerals to be fed, angle-iron legs fitted to the corners and reinforcing and supporting said trough at an elevation, a supporting bar beneath and connected to the legs at each end of said trough, a cover for said trough curved from side to side with closed ends of a length and breadth slightly greater than that of said trough, a depending support attached at each end to said cover, pivot bolts connecting said supports to the end of said trough for swinging movement, a connection between the lower end of at least one of said supports and the mid portion of said supporting bar including spring means for maintaining said top in position to cover said trough, and means for attaching said spring means to said depending support.

3. A cattle feeder comprising a relatively shallow substantially rectangular trough or container for food and minerals to be fed, angle-iron legs fitted to the corners and reinforcing and supporting said trough at an elevation, a supporting bar beneath and connected to the legs at each end of said trough, a cover for said trough curved from side to side with closed ends and of a length and breadth slightly greater than that of said trough, a depending support attached at each end to said cover, pivot bolts connecting said supports to the end of said trough for swinging movement, a connection between the lower end of at least one of said supports and the mid portion of said supporting bar including spring means for maintaining said top in position to cover said trough.

4. A cattle feeder comprising a trough or container for food and minerals to be fed, legs supporting said trough, a bar connected to the legs at each end of said trough, a cover for said trough of a length and breadth slightly greater than that of said trough, a depending support attached at each end to said cover, pivots connecting said supports to the end of said trough for swinging movement, a connection between the lower end of at least one of said supports and the mid portion of said bar including spring means for maintaining said top in position to cover said trough.

References Cited in the file of this patent
FOREIGN PATENTS 135,989     Australia _____ Jan. 23, 1950